United States Patent
Fujiwara et al.

(10) Patent No.: US 6,466,722 B1
(45) Date of Patent: Oct. 15, 2002

(54) METHOD OF FABRICATING OPTICAL NONLINEAR THIN FILM WAVEGUIDE AND OPTICAL NONLINEAR THIN FILM WAVEGUIDE

(75) Inventors: Takumi Fujiwara, Nagoya (JP); Akira Ikushima, Nagoya (JP); Osamu Komeda, Mishima (JP)

(73) Assignees: Toyota Jidosha Kabushiki Kaisha, Aichi-ken (JP); Toyota School Foundation, Aichi-ken (JP)

( * ) Notice: Subject to any disclaimer, the term of this patent is extended or adjusted under 35 U.S.C. 154(b) by 0 days.

(21) Appl. No.: 09/623,912

(22) PCT Filed: Feb. 23, 1999

(86) PCT No.: PCT/JP99/00788

§ 371 (c)(1),
(2), (4) Date: Sep. 11, 2000

(87) PCT Pub. No.: WO99/46632

PCT Pub. Date: Sep. 16, 1999

(30) Foreign Application Priority Data

Mar. 12, 1998 (JP) ............................................. 10/61609

(51) Int. Cl.$^7$ ................................................. G02B 6/10
(52) U.S. Cl. ...................................... 385/130; 385/122
(58) Field of Search ................................. 385/129, 130, 385/131, 132, 122

(56) References Cited

U.S. PATENT DOCUMENTS

| | | | |
|---|---|---|---|
| 4,896,930 A | * | 1/1990 | Tsuchitani et al. .......... 385/122 |
| 5,134,681 A | * | 7/1992 | Ratovelomanana et al. . 385/130 |
| 5,512,383 A | * | 4/1996 | Chikuma et al. ........... 385/130 |
| 5,783,498 A | | 7/1998 | Dotta ........................ 438/778 |
| 5,885,881 A | | 3/1999 | Ojha .......................... 438/381 |
| 6,031,945 A | * | 2/2000 | You et al. ................... 385/130 |
| 6,185,033 B1 | | 2/2001 | Bose et al. ................. 359/254 |
| 6,246,815 B1 | * | 6/2001 | Fujiwara et al. .............. 385/37 |

FOREIGN PATENT DOCUMENTS

| | | |
|---|---|---|
| EP | 0 617 301 A1 | 9/1994 |
| JP | 51-94974 | 8/1976 |

(List continued on next page.)

OTHER PUBLICATIONS

Second–Order Optical Nonlinearity in UV–Poled Glass Film (I) Takufumi Fujiwara (also see ISR).

(List continued on next page.)

*Primary Examiner*—Huy Mai
(74) *Attorney, Agent, or Firm*—Pillsbury Winthrop LLP

(57) ABSTRACT

A Ge-added $SiO_2$ thin film (12) is formed on a glass substrate (10), and metal film (14) is formed thereon (S11 to S13). By etching the metal film (14), a pair of electrodes (14a, 14b) mutually opposed at a predetermined interval is formed(S14). An insulating thin film (16) is formed on the insulating film (12) and the electrodes (14a, 14b) (S15). While applying ultraviolet radiation, a high voltage is applied between the electrodes (14a, 14b) to perform ultraviolet excitement polling to impart an optical nonlinearity to a channel region (18)(S16). By controlling the voltage application to the channel region (18) having the optical nonlinearity, the light transmitted through the channel region (18) is controlled. Thus, an optical nonlinear waveguide for propagating single mode light is formed on a glass substrate.

4 Claims, 4 Drawing Sheets

FOREIGN PATENT DOCUMENTS

| | | | |
|---|---|---|---|
| JP | 52-123250 | 10/1977 | |
| JP | 52-123251 | 10/1977 | |
| JP | 60-14222 | * 1/1985 | ............... 385/130 |
| JP | 1-152431 | 6/1989 | |
| JP | 2-78931 | 6/1990 | |
| JP | 2-146504 | 6/1990 | |
| JP | 3-160423 | 7/1991 | |
| JP | 4-131805 | 5/1992 | |
| JP | 5-088226 | 4/1993 | |
| JP | 8-81231 | 3/1996 | |
| JP | 8-146475 | 6/1996 | |
| JP | 10-090546 | 4/1998 | |
| JP | 10-161164 | 6/1998 | |
| WO | WO 96/16344 | 5/1995 | |
| WO | WO98/07064 | 2/1998 | |
| WO | WO 98/12592 | 3/1998 | |
| WO | WO98/14827 | 4/1998 | |

OTHER PUBLICATIONS

Second–Order Optical Nonlinearity in UV–Poled Glass Film (II) Takumi Fujiwara (Also see ISR).

Second–harmonic generation in germanosilicate glass poled with ArF laser irradiation, Appl. Phys. Lett. Aug. 1997, p. 1032–1034, T. Fujiwara (Also see ISR).

Takahashi et al: Applied Physics Letters, vol. 71, No. 8, Aug. 1997, pp. 993–995 (Also see ISR).

UV–Excited Poling and Electrically tunable Bragg Gratings in a Germanosilicate Fiber, T. Fujiwara et al, Mar. 1995 from Optical Fiber Communication '95 Technical Digest, vol. 8, post conference Edition, pp. 347–350.

Proceedings of the 1996 Electronics society Conference of IEICE, C–161, Core Layer for PLC Bragg Grating, Seiichi Kashimura et al.

Proceedings of the 1996 Electronics Society Conference of IEICE, C–303, Waveguide and Spot–Size conversion LD Integrated external cavity laser composed of spot–size converter integrated LD and UV written grating in silica waveguide on Si, T. Tanaka et al.

Atkins et al., Mechanisms of Enhanced UV Photosensitivty Via Hydrogen Loading in Germanosilicate Glasses, Electronics Letters, Jul. 8, 1993, vol. 29, No. 14, pp. 1234–1235.

Borrelli et al., Resonant and Non–Resonant Effects in Photonic Glasses, Journal of Non–Crystalline Solids, 185, 1995, pp. 109–122.

* cited by examiner

METHOD OF FABRICATING OPTICAL NONLINEAR THIN FILM WAVEGUIDE AND OPTICAL NONLINEAR THIN FILM WAVEGUIDE

This application is the national phase of international application PCT/JP99/00788 filed Feb. 23, 1999 which designated the U.S.

TECHNICAL FIELD

The present invention relates to a method of fabricating an optically nonlinear thin film waveguide using a glass substrate, and to an optically nonlinear thin film waveguide. More particularly, the present invention relates to controlling the shape of a waveguide having optical nonlinearity.

Optical functional elements utilizing second-order optical nonlinearity are known. While such elements are usually formed of a crystalline material, optical fibers are formed of a glass material. Considering cost and compatibility with an optical fiber, a need exists for fabricating the optical functional element of a glass material. In addition, as a planar element is suitable for achieving various optical control (signal control) functions, an optical functional element formed of a glass substrate is desired.

A method of fabricating a planar optical waveguide of a glass material is disclosed in Japanese Patent Laid-Open Publication No. Hei 8-146475. According to the method disclosed in that document, a glass film dispersed with fine particles is deposited on a glass substrate, and a resist mask is formed of photoresist over a portion to serve as a core. Next, the portion of the particle dispersed glass film that is not covered by the resist mask is removed by reactive ion etching to form an optical waveguide (core) portion. After removing the resist mask, a glass film is deposited to surround the core, and this portion serves as cladding. High power laser light is irradiated to a part of the core portion of the thus formed optical waveguide, thereby imparting high optical nonlinearity to the irradiated part.

Although the above-described method of fabricating a planar optical waveguide requires an etching step for leaving the portion of the resist film corresponding to the core portion, etching the film to leave only the core is difficult because this portion is thin. Also, optical nonlinearity obtained by this method is third-order nonlinearity, not second-order nonlinearity. Consequently, only a small nonlinearity is obtained, and therefore it is difficult to implement an element which sufficiently operates as an optical element.

RELATED ART

The applicant proposed a method of manufacturing a planar optical waveguide by UV-excited poling in Japanese Patent Application No. Hei 8-244965. According to this method, a pair of electrodes are formed on the surface of a glass substrate. Using the electrodes as a mask, a gap portion between the electrodes on the surface of the glass substrate is doped with germanium (Ge), so that the portion serves as a core. By applying a high voltage across the gap between the electrodes while irradiating ultraviolet rays, the core is subjected to ultraviolet poling and given second-order optical nonlinearity. The optical nonlinearity induced by UV poling is substantially as high as that of a crystalline material, such as $LiNbO_3$, and therefore the planar waveguide thus obtained can be used for forming a wide variety of functional optical waveguides.

It should be noted that single optical mode propagation and operation are essential to functional optical waveguides, such as optical switches and optical modulators used for optical communication, optical measurement, optical information processing, or the like. When a plurality of optical modes are present, propagation constants of the respective modes (refractive indices for the respective modes) are different, and therefore operation voltages for switching or the like utilizing optical interference effect will be different. Thus, in order for an optical waveguide to achieve operation such as switching, the waveguide is required to have a shape that allows single mode optical propagation.

The shape of an optical waveguide is determined by a combination of its refractive index and three dimensional size. According to the applicant's method outlined above, the thickness of an optical waveguide (depth from the surface of the substrate) formed by UV-excited poling is controlled using optical absorption of the substrate to change the intensity of ultraviolet radiation.

In order to achieve a single mode, the optical waveguide must have the smallest possible size, and the light intensity of ultraviolet radiation must be decreased for this purpose. However, the shape of the waveguide and the induced optical nonlinearity cannot be controlled independently from each other because the induced optical nonlinearity is also dependent on the light intensity of ultraviolet radiation. Further, higher optical nonlinearity is obtained as the intensity of ultraviolet radiation increases. Consequently, the size of the waveguide is increased for the sake of imparting a high optical nonlinearity, making it impossible to achieve single mode propagation.

DISCLOSURE OF THE INVENTION

The present invention aims to provide an optically nonlinear waveguide and a method of fabricating the optically nonlinear thin film waveguide wherein the optically nonlinear waveguide formed of a glass material has a sufficiently high second-order optical nonlinearity, and allows a proper three-dimensional shape to be obtained.

The fabricating method according to the present invention comprises the steps of forming a thin $SiO_2$ film containing Ge on a glass substrate, forming thin metal electrode films on the thin $SiO_2$ film with a gap between the electrode films having a shape corresponding to a waveguide pattern, and irradiating the Ge-containing thin $SiO_2$ film with ultraviolet radiation through the gap while applying a voltage across the gap between the thin metal electrode films.

Thus, the thin $SiO_2$ film containing Ge is formed on the glass substrate, and, therefore, it is limited to the Ge-containing thin $SiO_2$ film where second-order optical nonlinearity is induced by UV-excited poling. As a result, the width can be defined by the shape of the electrodes, and the depth can be controlled by the thickness of the Ge-containing thin $SiO_2$ film, so that the shape of the optically nonlinear waveguide can be controlled in three dimensions. A single mode propagation can be achieved in the optically nonlinear waveguide, to thereby ensure operation, such as switching, in the optically nonlinear waveguide. While the glass substrate is preferably formed of $SiO_2$ glass, other materials, such as sodium glass, can also be employed.

The method of fabricating an optically nonlinear thin film waveguide according to the present invention may further comprise the steps of providing a thin transparent insulating film on the thin metal electrode films to cover at least said gap portion, and irradiating the Ge-containing thin $SiO_2$ film with ultraviolet radiation through the gap between thin metal electrode films while applying a voltage across said gap.

Such provision of the insulating film can prevent electric discharge which would otherwise be caused by dielectric breakdown during application of a voltage across the gap between the metal electrodes for UV-excited poling. The thin insulating film must be formed of a material having a high breakdown voltage and transmitting ultraviolet radiation, preferably $SiO_2$.

Preferably, the optically nonlinear thin film waveguide is formed in a vacuum chamber. Because dielectric breakdown does not occur in a vacuum as it does in air, a sufficiently high voltage can be applied across the electrodes for UV-poling.

An optically nonlinear thin film waveguide according to the present invention includes a thin $SiO_2$ film containing Ge and formed on a glass substrate, and thin metal electrode films formed on the Ge-containing thin $SiO_2$ film with a gap between the electrode films having a shape corresponding to a waveguide pattern, wherein the portion of the Ge-containing thin silica film corresponding to the gap between the thin metal electrode films exhibits second-order optical nonlinearity.

The optically nonlinear thin film waveguide according to the present invention may further include a thin transparent insulating film formed on the thin metal electrode films to cover the gap.

BEST MODE FOR CARRYING OUT THE INVENTION

A preferred embodiment of the present invention will next be described with reference to the drawings.

[Configuration of Optically Nonlinear Thin Film Waveguide]

Figure 1A:
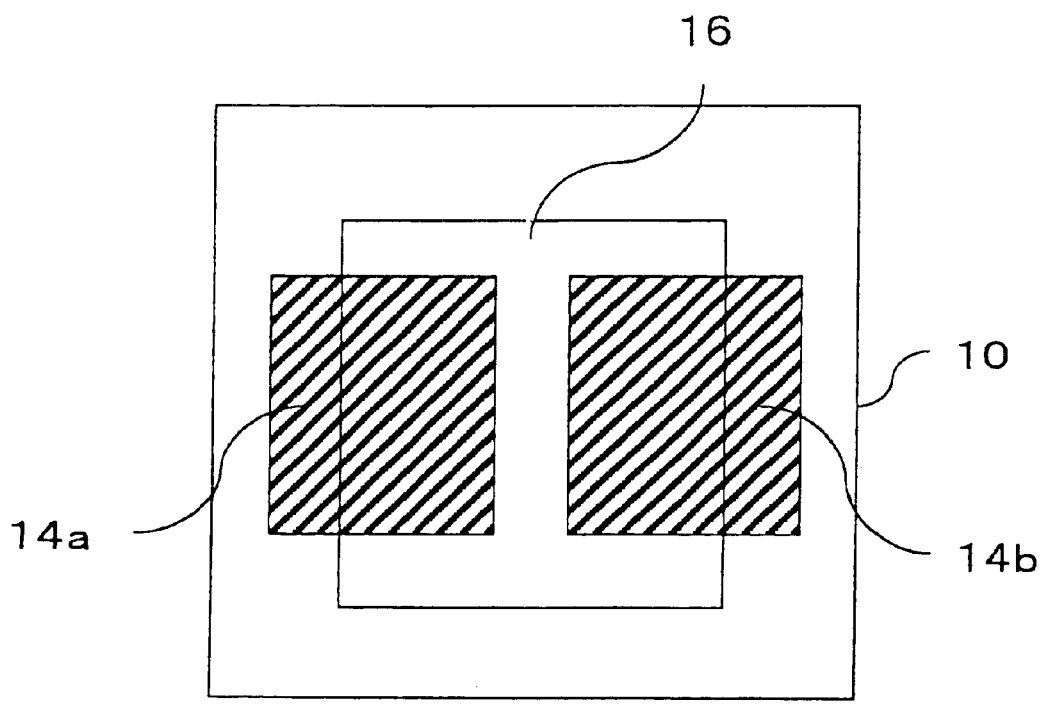
FIGS. 1A and 1B are top and side views, respectively illustrating a configuration of an optically nonlinear thin film waveguide according to one embodiment of the present invention.
Figure 1B:
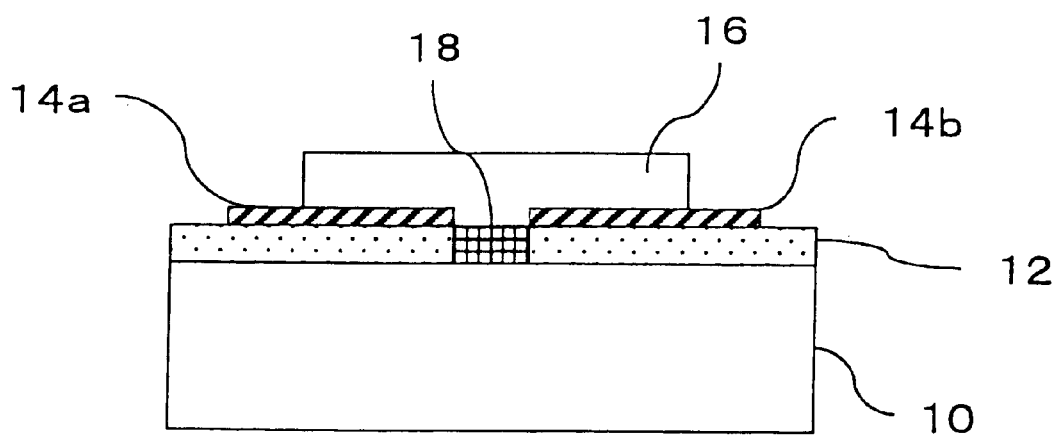

FIG. 1A and 1B schematically show a configuration of an optically nonlinear thin film waveguide (planar waveguide) according to the present invention. A glass substrate 10 is formed of silica glass ($SiO_2$ glass) as a flat sheet. On a surface of this substrate, a Ge-doped thin $SiO_2$ film 12 is formed, i.e. a thin $SiO_2$ film containing Ge, having a thickness of approximately 1–5 $\mu m$ and a Ge concentration of approximately 1–30 mol%. The specific values are determined in accordance with the specification of the planar waveguide, such as the wavelength to be used. Electrodes 14a and 14b are formed on the Ge-doped $SiO_2$ film 12, patterned to a prescribed shape and facing each other with a prescribed gap therebetween. The electrodes 14a and 14b are formed of thin films of, for example, aluminum (Al). A thin transparent insulating film 16 is formed covering the electrodes 14a and 14b and the gap therebetween. In this particular example, the thin insulating film 16 is formed of $SiO_2$.

A channel portion 18 is formed at a portion of the Ge-doped $SiO_2$ film 12 corresponding to the gap between the electrodes 14a and 14b, and to this channel portion 18 optical nonlinearity is imparted by UV-excited poling. As a result, optical characteristics of the channel portion 18 can be controlled by a voltage applied across the electrodes 14a and 14b. Light propagating through the channel portion 18 is controlled by the voltage applied across the electrodes 14a and 14b, whereby a planar waveguide functions as an optical functional element. While $SiO_2$ glass is used for the glass substrate 10 in the above-described example, other materials, such as sodium glass, can also be employed.

[Fabricating Method]

Figure 2:
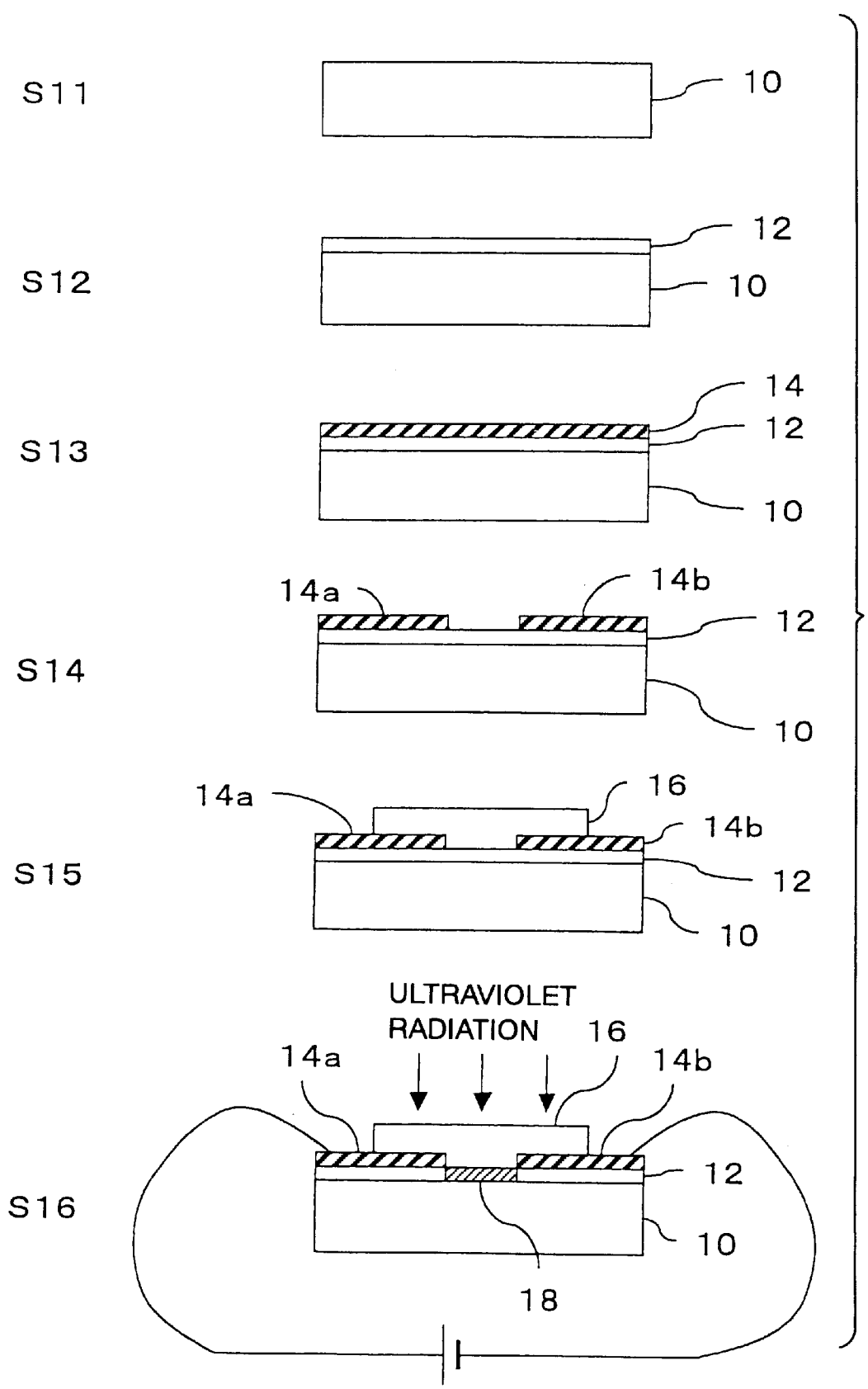
FIG. 2 illustrates steps of fabricating the optically nonlinear thin film waveguide.

A method of fabricating the above-described planar waveguide will be described with reference to FIG. 2. First, the glass substrate 10 formed of a planar $SiO_2$ glass sheet is prepared (S11), and then introduced into a vacuum chamber to form the Ge-doped $SiO_2$ film 12 on the surface of the substrate 10 (S12). The Ge-doped $SiO_2$ film 12 is formed by, for example, electron beam evaporation method using a sintered material containing 20% of $GeO_2$ as an evaporation source. While to obtain a dense film an assist method using an $Ar^+$ beam as an assist beam is preferable, other film formation methods may also be employed.

A metal film 14 is formed over the Ge-doped $SiO_2$ film 12 (S13). Although Al is used in this example, other metals may also be employed, and the metal film 14 may be formed by other methods than the evaporation method.

Next, a prescribed portion of the metal film 14 is removed by etching to form the pair of electrodes 14a and 14b (S14). In this particular example, a linear gap is formed between these electrodes 14a and 14b. Etching is performed by photolithography or the like. More specifically, resist is deposited over the entire surface of the metal film 14, and light is irradiated through a mask pattern used for forming the gap, thereby exposing a prescribed portion of the resist to the light. The portion corresponding to the gap is removed as a result of the light irradiation, thereby exposing the corresponding portion of the metal film 14, and the exposed portion of the metal film 14 is removed. Finally, the resist is removed to form the electrodes 14a and 14b facing each other with a gap therebetween.

A thin insulating film 16 is formed on the electrodes 14a and 14b (S15). This thin film 16 is formed of $SiO_2$ by an electron beam evaporation method or the like using $SiO_2$ as an evaporation source. The film 16 may be formed over the entire surface or over part of the surface, but is required to cover at least the gap portion formed by the electrodes 14a and 14b. In addition, the film 16 may be formed of any material, such as MgO or $MgF_2$, as long as the material can transmit ultraviolet radiation and has a high breakdown voltage.

Thus, after the gap between the electrodes 14a and 14b is covered with the insulating film 16, ultraviolet light is irradiated while applying a prescribed high voltage across the electrodes 14a and 14b, thereby performing UV-excited poling of the portion of the Ge-doped $SiO_2$ film 12 located between the electrodes 14a and 14b to form a channel portion 18 (S16).

More specifically, a voltage of approximately 1 kV is applied across the electrodes 14a and 14b, thereby applying an electric field of approximately $10^6$ V/cm to the channel portion 18. Under such circumstances, the channel portion 18 is irradiated with ultraviolet radiation using a pulsed ArF excimer laser (193 nm wavelength). A laser having an energy density of approximately 36 $mJ/cm^2$ and a pulse repetition rate of approximately 10 pps (pulse/second) is used to irradiate the channel portion 18 for a period of approximately 10–30 minutes.

When such a high voltage is applied across the electrodes 14a and 14b, electric discharge may occur at the portion facing the gap. According to the present embodiment, however, this portion is covered with the insulating film 16, thereby preventing electric discharge which would otherwise occur at the gap between the electrodes 14a and 14b due to air breakdown, and achieving effective UV-excited poling. It should be noted that as the electric field causing air breakdown is approximately $10^4$ V/cm, applying a voltage of $10^6$ V/cm to the channel portion 18 results in electric discharge. $SiO_2$ is a preferable material for the insulating film 16 because it transmits ultraviolet light (at a wavelength of, for example, 193 nm) and has a sufficiently high breakdown voltage.

Thus, the channel portion 18 is given second-order optical nonlinearity. In other words, the UV-excited poling process described above provides the channel portion 18 with the second-order optical nonlinearity with the magnitude (d constant) of 2 pm/V or more.

As described above, the Ge-doped $SiO_2$ film 12 is formed on the glass substrate 10 in this embodiment, and therefore it is limited to this film 12 where second-order optical nonlinearity is induced by UV-excited poling. As a result, the width of the waveguide can be defined by the shape of the electrodes 14a and 14b, and its depth can be controlled by the thickness of the Ge-doped $SiO_2$ film 12, so that the shape of the optically nonlinear waveguide can be controlled in three dimensions. Consequently, a single propagation mode can be achieved in the optically nonlinear waveguide, ensuring operation, such as switching, at the optically nonlinear waveguide.

While UV-excited poling is performed only at a single portion in the above example, separate electrodes 14a and 14b may preferably be formed at desired positions on the glass substrate 10 to form element regions with optical nonlinearity at the respective positions on the glass substrate 10. It is also preferable to restrict and define the position of the optical waveguide by patterning the Ge-doped $SiO_2$ film 12 with photolithography or the like. Further, it is also preferable, as disclosed in Japanese Patent Application No. Hei 8-244965, to alternately provide a region with optical nonlinearlity and an ordinary region in a periodic manner to be used as a grating portion.

[Other Configurations]

Figure 3A:
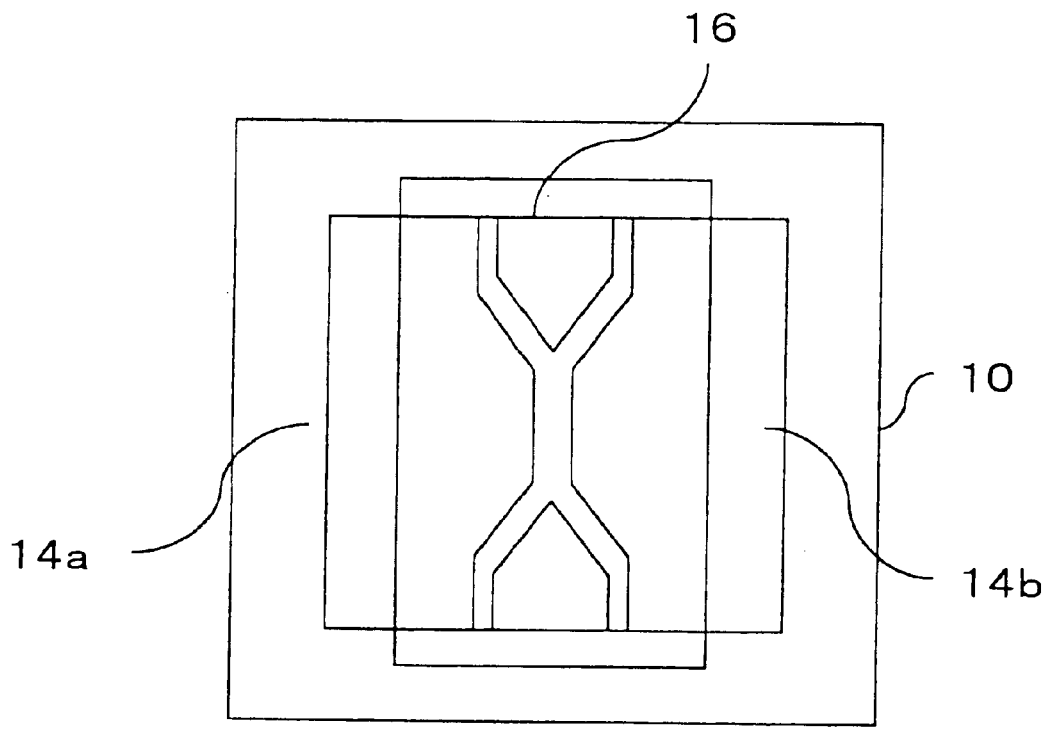
FIGS. 3A and 3B are top and side views, respectively illustrating another exemplary configuration of the optically nonlinear thin film waveguide.
Figure 3B:
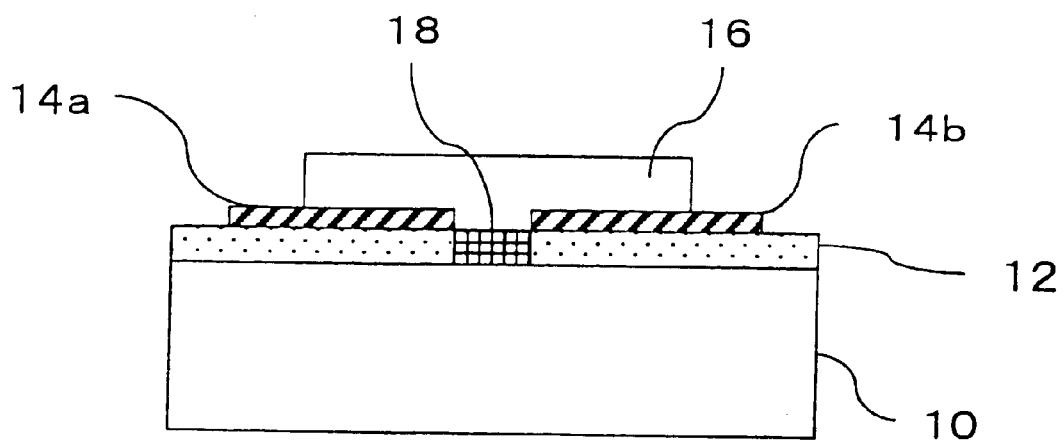

The planar waveguide according to the present invention can be used as various functional components. For example, as shown in FIGS. 3A and 3B, the channel portion 18 may be formed as a coupler, in which branched waveguides are converged once and then branched again, and the electrodes 14a and 14b are preferably disposed at the respective branched portions to which a voltage is applied.

The above-described configuration allows an optical phase or the like to be controlled by adjusting the voltage applied to the converged portion.

According to the optically nonlinear thin film waveguide of the present invention, a portion with optical nonlinearity can be formed at any desired position of the glass substrate 10, and, therefore, various optical functional components and circuits can be formed as desired. For example, an optical switch/coupler, a signal generator in a bi-directional optical transmission system, and the like, can be formed by the optically nonlinear waveguide of the present invention.

Figure 4:
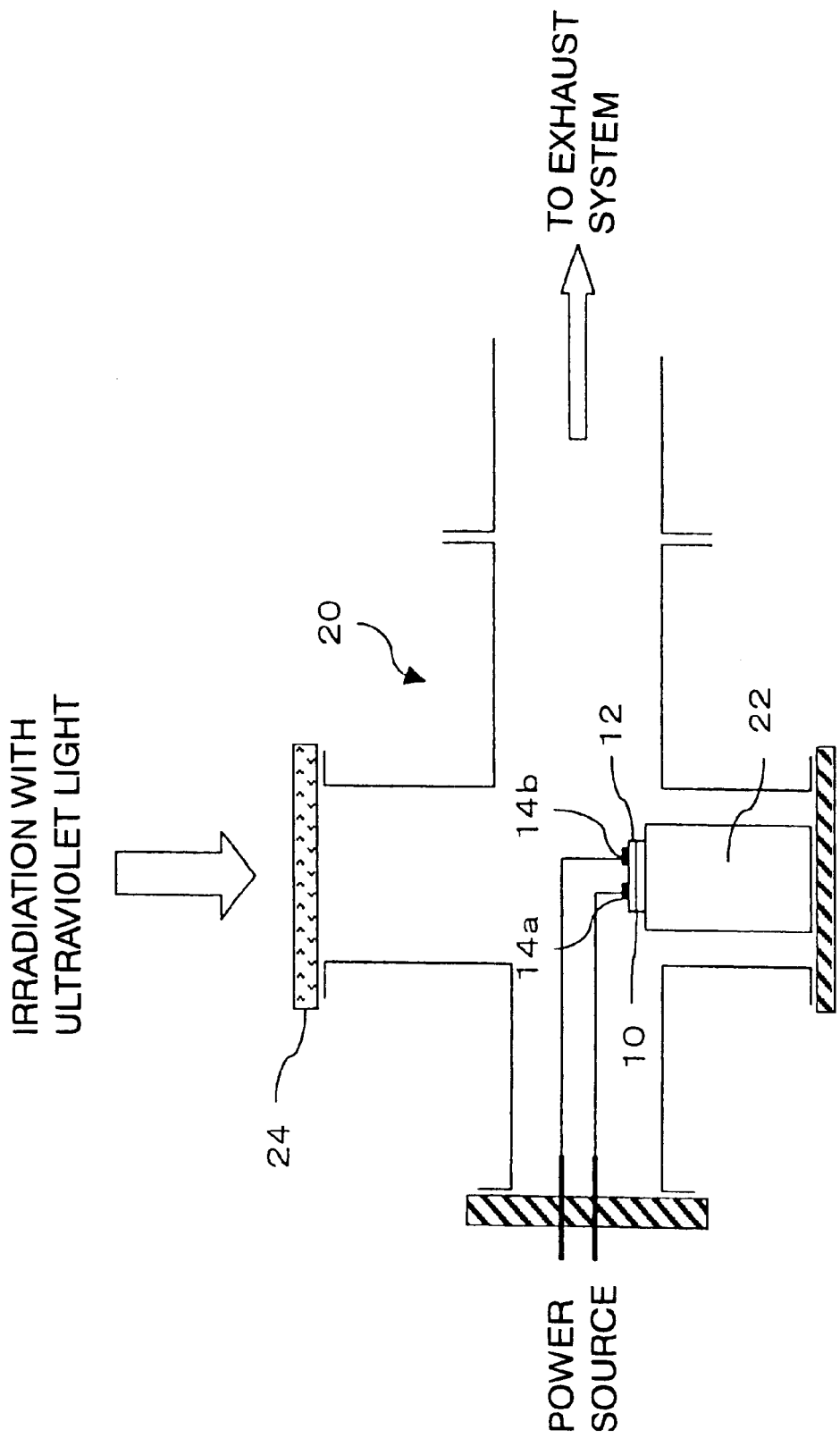
FIG. 4 illustrates fabrication of the optically nonlinear thin film waveguide in a vacuum chamber.

Further, the planar waveguide may be preferably fabricated in a vacuum by UV-excited poling. FIG. 4 shows a configuration of the device for such fabrication. A vacuum chamber 20 is formed of crossing pipe channels with three closed ends and an end connected to an exhaust system, such as a vacuum pump. A sample mounting table 22 is provided in the pipe channel downwardly extending in a vertical direction, and the glass substrate 10 having the electrodes 14a and 14b and the Ge-doped $SiO_2$ film 12 formed thereon is placed on the table 22. The electrodes 14a and 14b are connected to a power source outside the vacuum chamber. The pipe channel upwardly extending in the vertical direction is sealed by silica glass 24, through which ultraviolet radiation is applied.

Using the above-described device, a high voltage is applied to the electrodes 14a and 14b while irradiating the Ge-doped $SiO_2$ film 12 with ultraviolet radiation. In contrast to air, dielectric breakdown does not occur in a vacuum. Therefore, a desired high voltage can be applied across the electrodes 14a and 14b to carry out UV-excited poling, to thereby impart desired optical nonlinearity to the portion of the Ge-doped thin film 12 positioned between the electrodes. It should be noted that the Ge-doped $SiO_2$ film 12, and the electrodes 14a and 14b are preferably formed in the same vacuum chamber 20.

Using the above-described device, light was irradiated by ArF excimer laser (193 nm wavelength) having an energy density of 100 mJ/cm$^2$ for $10^4$ pulses (10 pps). With the pressure in the vacuum chamber 20 of approximately $10^{6-}$ Torr and the poling electric field of $8\times10^4$ V/cm, optical nonlinearity of 3.8±0.3 pm/V was obtained at the channel region.

INDUSTRIAL APPLICABILITY

The optically nonlinear thin film waveguide of the present invention can be used for an optical switch/coupler, a signal generator in a bi-directional optical transmission system, and the like.

What is claimed is:

1. A method of fabricating an optically nonlinear thin film waveguide, comprising the steps of:

forming a thin $SiO_2$ film containing Ge on a glass substrate;

forming thin metal electrode films on said $SiO_2$ film with a gap therebetween having a shape corresponding to a waveguide pattern; and irradiating said Ge-containing $SiO_2$ film with ultraviolet radiation through said gap while applying a voltage across said gap between said thin metal electrode films.

2. The method according to claim 1, wherein a thin transparent insulating film is provided on said thin metal electrode films to cover at least said gap, and then said Ge-containing $SiO_2$ film is irradiated with ultraviolet radiation through said gap while a voltage is applied across said gap between said metal electrode films.

3. An optically nonlinear thin film waveguide, comprising:

a thin $SiO_2$ film containing Ge and formed on a glass substrate; and thin metal electrode films formed on said Ge-containing thin $SiO_2$ film with a gap therebetween having a shape corresponding to a waveguide pattern; wherein the portion of said Ge-containing thin $SiO_2$ film that corresponds to said gap between said thin metal electrode films has second-order optical nonlinearity.

4. The waveguide according to claim 3, further comprising a thin transparent insulating film on said thin metal electrode films to cover said gap.

* * * * *